United States Patent [19]
Heller

[11] 3,775,564
[45] Nov. 27, 1973

[54] SWITCHING ARRANGEMENT FOR CONFERENCE CALL CONNECTIONS IN PRIVATE BRANCH TELEPHONE EXCHANGES

[75] Inventor: Siegbert Heller, Munich, Germany

[73] Assignee: Siemens Aktiengesellschaft, Berlin and Munich, Germany

[22] Filed: Mar. 24, 1971

[21] Appl. No.: 127,527

[30] Foreign Application Priority Data

Mar. 25, 1970 Germany .................. P 20 14 478.9

[52] U.S. Cl. .............................................. 179/18 BC
[51] Int. Cl. .............................................. H04m 3/56
[58] Field of Search .................................. 179/18 BC

[56] References Cited

UNITED STATES PATENTS

| | | | |
|---|---|---|---|
| 3,504,130 | 3/1970 | Gorgas et al. .................. | 179/18 BC |
| 3,622,708 | 11/1971 | Guenther ........................ | 179/18 BC |

*Primary Examiner*—William C. Cooper
*Attorney*—Birch, Swindler, McKie & Beckett

[57] ABSTRACT

A switching arrangement for the connection of conference calls in a private branch telephone exchange is described. The exchange has conference lines connectable over a repeater network. The subscriber sets taking part in a conference call are successively dialed by an initiating subscriber set. A conference device is provided and is constituted by an initiator device, conference unit devices for each subscriber set and a repeater network. The conference device has connected to its inputs, over connection circuits and conference lines for each initiator unit and conference unit, switching matrices which connect the latter with trunk repeaters. The conference device includes switching means controllable by switching operations of the initiator whereby a first switching device connects the initiator unit to the repeater network or a matrix line leading to the conference units. A second switch in the switching unit connects the connection circuit of the next free conference unit with the repeater network or the matrix line, depending on the position of the first switch.

4 Claims, 2 Drawing Figures

SWITCHING ARRANGEMENT FOR CONFERENCE CALL CONNECTIONS IN PRIVATE BRANCH TELEPHONE EXCHANGES

BACKGROUND OF THE INVENTION

The invention relates to a circuit arrangement for the completion of conference connections in telephone exchanges, especially private branch exchanges, having conference lines which can be connected together over a transmitter network, and in which the participating subscriber units (telephones) which are to take part in the conference call are successively dialed by a neighboring subscriber unit functioning as the initiator or caller and which is also connected to the common transmitter network.

There are a number of conference call switching devices already known in directly and indirectly controlled private branch exchanges, in which individual subscribers are connected together in various ways for the purpose of carrying out a conference conversation. Among these is an arrangement in which the private branch subscribers which are to be connected for a conference are successively called by a neighboring unit functioning as the initiator by the use of dialed characterizing signals and connected to a common conference repeater network.

German Pat. No. 494,519 shows a circuit arrangement for telephone installations, having devices which allow the carrying out of conference conversations, which in addition to the switching devices for normal individual traffic have special conference supplemental devices in those subscriber units that are to have the capability to simultaneously take part in a conference. The subscriber functioning as initiator can utilize these supplementary conference devices to reach the individual conference partners without utilizing the switching device for normal traffic. After occupying a conference line, he dials the call numbers of the different conference participants with his dialing mechanism. After dialing the conference participants, the initiator activates a common call button, whereby, all of the dialed conference participants after switching over from the house network to the common conference line either successively or simultaneously receive the call tone (i.e., a ring or buzz indicating someone is calling). By hanging up his receiver, each conference participant can independently leave the conference whereby he is immediately reconnected to the house network.

In German Pat. No. 1,074,665, there is shown a circuit arrangement for a conference device in private branch telephone exchanges in which an optional combination of subscribers for a conference call can be produced by merely dialing. This circuit arrangement for private branch telephone exchanges with separate speech and control paths has the connection and control units for normal telephone connections. Additionally, a conference transmission and a conference switching matrix are provided. The initiation of a conference by a properly equipped subscriber takes place when the initiator connected at first to the normal internal transmission line is switched over to a special conference transmission line after the evaluation of a conference identification numeral dialed by him which controls a common marker over a conference call seeker. This conference transmission stores in its assigned conference register the call number of the conferees dialed by the initiator, and then individually switches these subscribers onto the conference switching matrix by means of the common marker. At this point the conferee subscribers are called, and the conversations may begin.

In view of the complexity of the above-described devices, the invention seeks to solve the problem of making possible the formation of conference connections between selected subscriber units in a simple manner in already existing private branch telephone exchanges with small additional expense and by using the connection units and lines already utilized for normal connection traffic.

SUMMARY OF THE INVENTION

This problem is solved according to the principles of the invention in that a conference device comprising an initiator unit which can be used by the initiator-subscriber, by dialing a numeral which identifies conference units for the participating subscriber units which are to be called in and the transmitter network. The conference device is connected on the input side over connection circuits and conference lines provided one per initiator unit and conference unit to switching matrices which connect them with trunk repeaters. The conference device includes two switching arrangements controllable by switching operations of the initiator. The first switching arrangement connects the initiator unit to the repeater network or to a matrix line leading to the conference units, and the second switching arrangement depending on the switching position of the first switching arrangement connects the connection circuit of the next free conference unit with the repeater network or the matrix line.

The advantages obtained by the invention are that the conference device comprising the initiator unit, the conference units assigned to the individual conference participants and the repeater network with its conference units can be connected over connecting circuits assigned to these conference units like subscribers to the trunk repeaters and therefore, can be optionally exchanged for subscriber units within an existing private branch exchange and conversely. A conference device according to the present invention allows each chosen subscriber unit of the private branch exchange to be brought into a conference connection by a subscriber unit characterized as the initiator whereby the maximum total number of conference participants is limited technically only by the number of conference units provided per conference device. If necessary, the inclusion of a plurality of a conference devices in a private branch exchange is possible, each of which can be occupied by each of the subscriber installations entitled to initiate a conference by dialing the characterizing number.

A further advantage results from the fact that the request for participation in a conference connection, as well as the actual conference conversation, takes place over one and the same connecting path within the private branch exchange. Thus, supplementary connecting paths reserved only for conference connections, as are necessary in known arrangements, are not necessary according to this invention. The connecting path between conference participants and the assigned conference device leads over connecting units and connecting lines already present in the installation for normal connection traffic. Thereby, already present trunk repeaters are used for the storage and evaluation of the dialed characterizing signals in coded or uncoded form (push-button selection or dialed selection).

In accordance with a further development of the invention, the switching operations carried out by the initiator for the production of a conference connection comprises a series of similar impulses emitted successively in time which control the aforementioned two switching arrangements (for example, activation of the ground button). In any given case, two impulses complete the connection of an individual conference participant, who is to be called, to the common conference transmission network. The first impulse brings the first switching arrangement and the contact pair of the second switching arrangement in the affected conference unit into an operative state for the purpose of calling the conference participants, and the second impulse brings both switching arrangements back to an inoperative state for the purpose of switching through the conference connection.

Without additional expense, and in a simple manner, subscriber units already a part of the conference connection can confer with each other during the calling of further subscriber units by the conference leader. The conference leader (initiator) can at any time bring into the conference further subscriber units, including trunk subscriber units without interruption of the conference conversation by giving a simple characterizing signal (for example, activation of a ground button) without disturbing the already conferring subscriber units.

BRIEF DESCRIPTION OF THE DRAWINGS

The invention will be best understood by reference to a description of a preferred embodiment given hereinbelow in conjunction with the drawings in which.

DETAILED DESCRIPTION OF THE DRAWINGS

Figure 1:
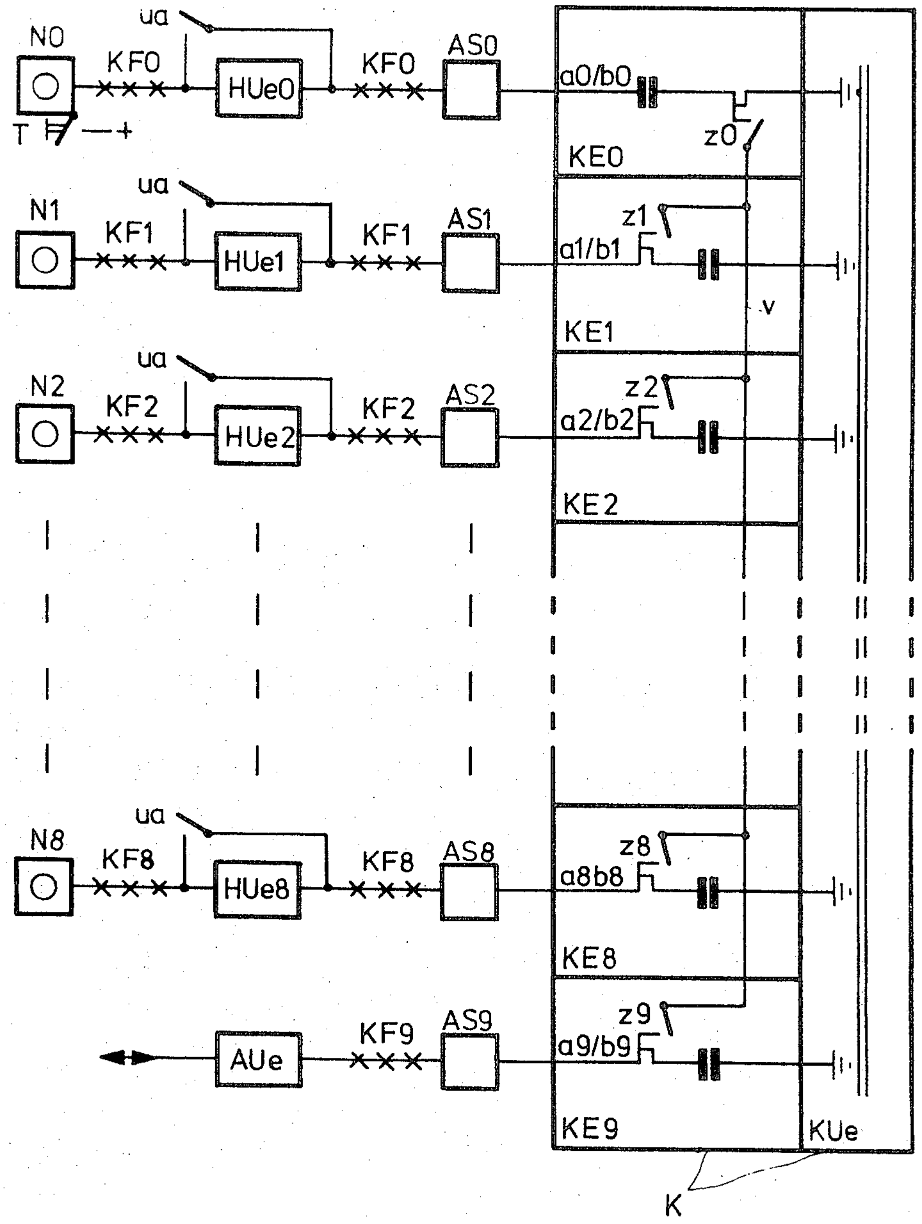
FIG. 1 is a block schematic diagram of a preferred embodiment of circuitry for completing a conference connection according to the invention.

The conference device K represented in FIG. 1, of which in an installation, if necessary, a plurality can be used, is constituted by: the initiator unit KEO; nine conference units KE1 through KE9, of which, according to one embodiment of the invention, in any given case, three conference units are combined for compact insertion and of which for reasons of clarity, only the units KE1, KE2, KE8 and KE9 are represented; and a repeater network KU*e*, over which the conference conversation develops after the switching through of the conference lines *a*0/*b*0 through *a*9/*b*9 assigned to the individual subscriber units. Connecting circuits AS0 through AS9 are provided one per each of the initiator unit and conference units, and the initiator unit and the conference units can be connected through to a local house repeater HU*e* or to an exchange office repeater AU*e* over the connecting circuits and over three stage switching matrices KF0 through KF9. The house repeaters can be connected over the same switching matrices with the subscriber unit N0 functioning as the initiator or with the subscriber units N1 through N8 to be called in to the conference. For reasons of clarity, the switching matrices KF0 through KF8 are in each case represented twice in FIG. 1, whereby their three stage character is indicated in each case by three crosses lying on the trunk lines. Because each branch exchange subscriber can function as initiator through a simple switching measure, for example, through shunting of a diode, it is assumed in this example that the subscriber unit N0 is operating as the conference initiator.

For the formation of a conference connection, the initiator dials a characterizing number which identifies a conference device,whereupon, a connection with the initiator unit KE0 of the selected conference device K is produced. The house repeater HU*e*0 occupied by the initiator with the lifting of the subscriber handset or the like is bridged in a direct current-like manner after the dialing of the characterizing number by a contact ua of a not shown relay, which is activated after the dialing of the conference characterizing number. The initiator N0 is connected with the repeater network KUe over the initiator unit KE0. If the initiator now activates his ground button T, his speech lines *a*0/*b*0 are separated from the conference repeater network KU*e* by a first switching arrangement contact pair *z*0 and connected with a matrix line *v*, to which a second switching arrangement which has one switching device, or pair of contacts, *z*1 through *z*9 for each conference unit, is connected. In addition, through this first ground button activation, the switching device *z*1 of the second switching arrangement in the conference unit KE1 is activated. The initiator is now connected over the initiator unit KE0 and the conference unit KE1, as well as their connection circuit AS1, over the three stage switching matrix KF1 to a further house repeater HU*e*1, from which the initiator receives a dialing signal.

The call number of the first desired conference participant dialed now by the initiator is stored and evaluated in the house repeater HU*e*1. At this point, the completion of a connection over the three stage switching matrix KF1 to the subscriber unit N1 takes place. The initiation path from the initiating N0 over the first switching arrangement *z*0 in the initiating unit KE0, over the matrix line *v*, as well as over the switching device *z*1 of the second switch-over arrangement, which switch-over device lies in the conference unit KE1, to the first conference participating suscriber unit N1 is thereby produced. If the initiator activates his ground button T for the second time after the registering of this first conference participant N1, then both switching arrangements, *z*0 in the initiator unit KE0 and *z*1 in the conference unit KE1, are returned to their inoperative positions, whereat the initiator as well as the first subscriber unit to be called in are connected with the common repeater network KU*e*. In the same way, through each two time activation of the ground button T further conference participants, including subscribers on the main outside exchange connected over a trunk repeater AU*e*, are connected with the repeater network KU*e*. Participating units already brought into the conference can confer without further disturbance during the time in which the initiator dials new conference participants.

The eighth subscriber unit N8 to be brought in will be switched to conference by the fifteenth and sixteenth activation of the ground button T on the part of the initiator. After his fifteenth activation of the ground button, the initiator is separated from the repeater network KU3 and connected over the switching device *z*8 lying in the conference device KE8 with the house repeater HU*e*8, from which the initiator again receives a dial signal. After the dialing of the call number of the subscriber unit N8, the completion of the connection running over the matrix line *v* from the initiator N0 to the participating unit N8 takes place. After the reporting of the participating unit N8 and the sixteenth activation of the ground button T, both switching arrangements (*z*0 in KE0 and *z*8 in KE8) are returned to their inoperative positions, whereby the initiator N0 as well as the conference participating unit N8 are connected with the repeater network KU*e*.

All of the conference participants can leave the conference merely by hanging up their handsets. If the initiator leaves the conference, no further participating units can be brought into the conference, but the subscribers already connected to the conference can certainly confer further. The initiator can return to the conference at any time, whether for the purpose of renewed participation in the conference or to bring in new conference participants.

Incoming office conversations can also be connected to the conference through the conference device K. Indeed, up to nine office subscribers corresponding to the number of the conference units KE1 through KE9 of the conference device K can be connected. The formation of a conference connection between office subscribers is brought about in a manner not shown in detail herein, but known per se, through the switch board by the operator. If an incoming office connection is presented to the switch board, then it is put onto a free conference unit KE of the conference device K, which conference unit can be directly dialed by the operator and held by this conference unit for a period of time (approximately 100 seconds) prescribed by a time device not shown which is started upon the occupation of the conference unit. If, during this prescribed period of time, an initiator notified by the operator occupies this conference device K over the initiator unit KE0, then through the switching off of the time device which takes place with this occupation, the exchange connection is held by the initiator or by further conference participants which have been brought in (exchange or house participants), until the last conference participant has dearted from the conference by hanging up his headset. If the holding period is exceeded, however, without an initiator occupying the conference device, then the extinction of the incoming exchange office connection by a not-shown separated relay switched on by the time device causing the opening of the office loop which separator relay is housed in the initiator unit KE0 just like the time device, immediately takes place.

Figure 2:
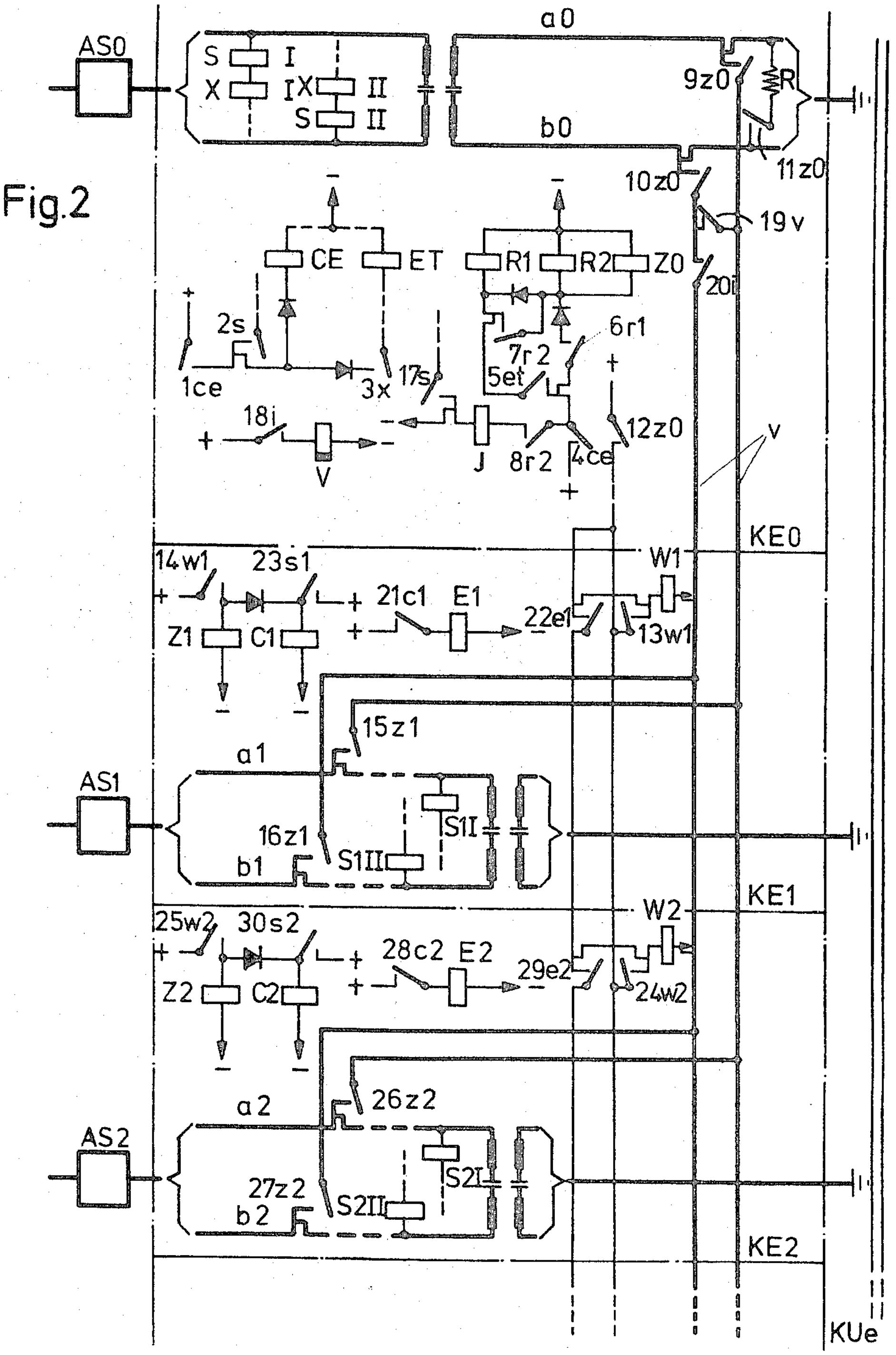
FIG. 2 is a detailed schematic diagram of a preferred circuit arrangement for the conference device used in the FIG. 1 embodiment.

With reference to FIG. 2, there follows now a more exact description of the means by which connections are completed in the conference device K.

The initiator N0 occupies the connection circuit AS0 of the initiator unit KE0 by the dialing of an identification number characterizing a certain conference device K, which characterizing number is picked up and evaluated in the house repeater HUe0 made ready by the lifting of his handset. The occupation of this connecting circuit AS0 and the switching through in the network and in the house repeater HUe0 occur in the same way and manner as in the occupation of cross connection repeaters, which are well known to those skilled in the art. If the evaluation device in the house repeater HU*e*0 recognizes that the number dialed by the initiator N0 is a conference identification number, the house repeater HU*e*0 (FIG. 1) is bridged in the direct current manner by the contact ua of a not shown realy. In the initiator unit KE0 the relay CE engages, and this relay holds itself further over its contact 1ce and an unactivated contact 2*s* of a feed circuit relay S. The initiator connected with the repeater network KU*e* through the lines *a*0, *b*0 now receives feed current, but no listening signal is present.

If the initiator now activates his ground button T, the relay ET is switched on over the closed contact 3*x* of the differential relay X which herewith engages. Over the activated contacts 4*ce* and 5*et* the relay R1 of a so-called return inquiry beat circuit engages. After release of the ground button the differential relay S releases again and interrupts the circuit for the relay ET by opening its contact 3*x*. Over still activated contact 4*ce* and the contact 5*et* which has returned to its rest position, as well as over the closed contact 6*r*1, the relays R2 and Z0 of the return inquiry beat circuit are now switched on, while contact 8*r*2 closes the circuit for the impulse relay J. Over the switching contact pair, 9*z*0 and 10*z*0, the speech lines *a*0, *b*0 of the initiator are separated from the repeater network KU*e* and connected to the multiple line *b* leading to the conference units KE1, KE2 and so on. Meanwhile, the contact 11*z*0 applies a resistance R as a terminal resistance to the repeater network KU*e*. Over a further contact 12*z*0 of the relay Z0 of the return inquiry beat circuit, a relay W1 of the conference unit KE1, which relay lies on a make and break contact chain (sequence contact chain) 22*e*1, 29*e*2 . . . passing through all of the conference units, is engaged over the unactivated switching contact 22*e*1. The relay W1 holds itself over its own contact 13*w*1. Through the closing of a further contact 14*w*1, the relays Z1 and C1 are switched on, whereby through the closing of 21*c*1, the relay E1 which characterizes the conference unit KE1 as occupied, engages. The contacts 22*e*1 further switches the successive contact (make-break contact chain) so that in case of a renewed occupation of the matrix line *v* taking place at a later point in time the relay W2, instead of relay W1 in KE1, of the conference unit KE2 can engage. The switching contact pair 15*z*1/16*z*1, activated by the attraction of the relay Z1, switch the speech lines *a*1, *b*1, in unit KE1, onto the matrix line *v* which is connected with the speech lines *a*0, *b*0 of the initiator. Over the connecting circuit AS1 of the conference unit KE1, the speech lines *a*1, *b*1 are now switched through over the switching matrix KF1 to the house repeater HU*e*1, from which the initiator receives dialing signals.

With the following dialing of the call number of the first conference participant by the initiator, the feed circuit bridge relay S is activated by impulses, and the feed circuit bridge relay transmits the impulses by means of its contact 17*s* to the dialing impulse relay J. Relay J has a contact 20*i* which passes on the dialing impulses over the matrix line *v* and the speech lines *a*1, *b*1 to the occupied house repeater HU*e*1. After pick up and evaluation of the dialing impulses, the desired first conference participant N1 receives a call tone (telephone ring) from this house repeater. During the dialing, a delay relay V was switched in through contact 18*i*, and the delay relay first releases at the end of the dialing series and bridges the speech lines *a*0, *b*0 of the initiator with its contact 19*v*.

After the reporting of the first conference participant through a second activation of the ground button T, by the initiator, his own speech lines *a*0, *b*0, as well as those lines of the first conference participant *a*1, *b*1, are once again connected to the repeater network KU*e*. At the depression of the ground button, the relays X and ET once again engage in the initiator unit. With the contact 5*et* activated, relay R1 now releases, while the relays R2 and V0 of the return inquiry beat circuit still hold themselves over the also activated contacts 4*ce* and 7*r*2. These relays first disengage after the release of ground button T and after the release of the relays X and ET. Thereby, the speech lines *a*0, *b*0 of the initiator are again connected with the repeater network KU*e* through the return of the switch-over contact 9*z*0/10*z*0 to its inoperative position. Through the opening of the contact 12*z*0, the relay W1 in the conference unit KE1 also releases and thereby also the relay Z1, while the relay C1 still holds further over the contact 23*s*1 of the feed circuit bridge relay S1, which is under current over the loop of the called conference participant N1, until this subscriber hangs up. Through the release of the relay Z1, the speech lines *a*1, *b*1 are also once again connected with the repeater network KU*e* by the return of the switch-over contact pair 15*z*1/16*z*1 to its inoperative position. The initiator can now speak over the conference repeater network KU*e* with the first conference participant N1, called over the conference unit KE1.

To call the next conference participant, the initiator once again activates his ground button. At this third activation, the same circuit functions are executed in the initiator unit KE0, especially in the return inquiry circuit, as described above. The speech lines of the initiator *a*0, *b*0 are again connected to the matrix line *v* by the switching contact pair 9*z*0/10*z*0. But now, over the closed contact 12*z*0, the relay W2 of the conference unit KE2 is activated. In contrast to this relay W1 cannot be attracted because of the activated further switching contact 22*e*1 of the successive contact chain (make and break contact chain). While relay W2 holds itself over its contact 24*w*2, it switches on the relays Z2 and C2 in conference unit KE2 with its contact 25*w*2. The further switching relay E2 is switched on over contact 28*c*2, which further switching relay E2 switches the successive contact chain (make and break contact chain) further to the conference unit KE3 with its contact 29*e*2. Through the switching contact pair 26*z*2/27*z*2, the lines *a*2, *b*2 in the conference unit KE2 are now separated from the repeater network KU*e* and connected to the matrix line *v*.

In the same way as in the case of the calling of the first conference participant, the occupation now takes place of the house repeater HU*e*2 from which the second conference participant N2 is called. With the fourth ground button activation, the initiator switches his speech lines *a*0, *b*0 as well as those of the second called conference participant *a*2, *b*2 once again onto the repeater network KU*e* through the release of the relays Z0 in the initiator unit KE0 and Z2 in the conference unit KE2. In the conference unit KE2 relay C2 holds itself after the release of the relay W2 over the contact 30*s*2 of the feed circuit bridge relay S2 engaged over the subscriber line of the second called conference participant until this participant hangs up.

In the same way through the occupation of the next free conference units KE3, KE4 and so forth, each through a two time activation of the ground button, further participants are called to the conference. During this process, the previously called conference participants can continue to confer with each other. The conference device K will be released when the last of the conference participants has departed from the conference by hanging up his handset.

The description of a preferred embodiment given hereinabove is only exemplary and in no way limiting. The scope of the invention is defined only by the appended claims.

I claim:

1. Apparatus for completing conference connections in private branch exchanges having conference lines connectable over a repeater network and in which the subscriber sets taking part in a conference connection are successively dialed by any one of said subscriber sets functioning as an initiating set, comprising:

- at least one conference device constituted by initiator means and conference unit means for each subscriber set and a repeater network,
- connecting circuit means for connecting said initiator means and said conference unit means to respective subscriber sets,
- conference lines connecting said initiator means and said conference unit means to said connecting circuit means,
- a plurality of trunk repeaters,
- a multiple line interconnecting said conference unit means,
- a plurality of switching matrices connecting said connecting circuit means and said conference lines to said trunk repeaters, and
- switching means in said conference device controlled by said initiator means including first switching means connecting said initiator means with either said repeater network or said multiple line and second switching means operative in dependence on the position assumed by said first switching means for connecting the one of said connecting circuits associated with the next free one of said conference units to either of said repeater network or said multiple line.

2. The apparatus defined in claim 1 wherein said first switching means comprises;

- first contact means in said initiator means having first and second operating states, said first contact means in said second state connecting said initiator conference line to said repeator network, said first contact means in said first state connecting said initiator means to said multiple line, and
- wherein said second switching means comprises:
  - second contact means comprising a plurality of contacts, one for each said conference unit, having first and second states, each said contact in said second contact means in said first state connecting the connecting circuit of the conference unit associated therewith with said repeator network, each said contact in said second contact means in said second state, which is brought about by activation of said switching means, connecting the connecting circuit of the conference unit associated therewith to said multiple line.

3. The apparatus defined in claim 2, further comprising:

- third contact means comprising a chain of sequentially activated make-before-break contacts which operate to switch to the next succeeding contact by means of a conference unit associated with a given one of said make-before-break contacts if the chain is busy, said second switching means being activated in a sequence prescribed by said third contact means.

4. The apparatus defined in claim 2 further comprising:

means for emitting a series of sequential impulses from said initiator means, said impulses being coupled to said first and second switching means for controlling same such that a first impulse causes said first switching means and first contact means associated with the first switching unit to switch to a first state, a second impulse causes said first and second switching means to return to the second and first states, respectively, and further pairs of impulses cause succeeding conference units to change state in a like manner by like switching operations.

* * * * *